United States Patent [19]

Summerfield

[11] Patent Number: 4,538,992
[45] Date of Patent: Sep. 3, 1985

[54] IMAGE PICK-UP ASSEMBLY FOR A VEHICLE TRAINING SIMULATOR

[75] Inventor: Anthony J. Summerfield, Horsham, England

[73] Assignee: The Singer Company, Binghamton, N.Y.

[21] Appl. No.: 611,253

[22] Filed: May 17, 1984

[30] Foreign Application Priority Data

Jun. 6, 1983 [GB] United Kingdom ............... 8315512

[51] Int. Cl.³ ............................................. G09B 9/08
[52] U.S. Cl. ....................................... 434/38; 434/47
[58] Field of Search ................... 434/20, 32, 38, 39, 434/40, 43, 47, 62, 63, 69, 70

[56] References Cited

U.S. PATENT DOCUMENTS 3,012,337 12/1961 Spencer, Jr. et al. ................ 434/43
3,820,134 6/1974 Wilton et al. ........................ 434/38
3,826,864 7/1974 Parfre ................................... 434/43
4,365,960 12/1982 Reed et al. ........................... 434/38

Primary Examiner—Richard C. Pinkham
Assistant Examiner—Vincent A. Mosconi
Attorney, Agent, or Firm—Douglas M. Clarkson

[57] ABSTRACT

The disclosure describes an image pick-up assembly for use in a vehicle training simulators and the assembly has an optical system to detect images in a direction of travel and to transmit these images to an electronic camera. A terrain-following head unit is formed to traverse a terrain model and contains the optical system. A gimbal joint couples the terrain-following head unit with the electronic camera to permit relative universal movement between the two. Releasable locking device is described to lock the terrain-following head unit in an operating position relative to the electronic camera so that it is releasable by a force when the terrain-following head unit engages an obstacle on the terrain model.

12 Claims, 5 Drawing Figures

IMAGE PICK-UP ASSEMBLY FOR A VEHICLE TRAINING SIMULATOR

BACKGROUND OF THE INVENTION

The present invention, generally, relates to vehicle training simulators in which an image pick-up assembly traverses a terrain model in order to present an image of the terrain to an operator who is being trained on the simulator. More particularly, the image pick-up assembly is of the type which usually has a television camera and a terrain-following head unit to traverse the terrain model. The terrain-following head unit has an optical system to transmit an image of the terrain to the television camera.

In a known image pick-up assembly described in British Pat. No. 2,014,918 which is assigned to the same Assignee as the present invention, the optical system of the terrain-following head unit consists of a mirror arranged at about 45 degrees to reflect the view of the terrain as seen in a generally horizontal direction into the television camera which is mounted with its optical axis substantially perpendicular to the generally horizontal direction of view. The terrain-following head unit is clamped rigidly to the vertically-extending television camera.

An articulated shoe representing a scaled-down vehicle profile is arranged at the bottom of the terrain-following head unit to traverse the terrain model. As the television camera is moved across the terrain model, the articulated shoe is in contact with the surface of the terrain model and follows the terrain model contours in three axes, i.e., pitch, roll, and heave.

There are two "position" transducers in contact with the articulated shoe that sense the pitching and rolling movements. Heave movements resulting in a change in the height of the articulated shoe relative to the terrain-following head unit are measured by a separate "position" transducer.

The measured pitch movements of the articulated shoe are used to control rotation of the mirror in the optical system about a horizontal axis through one-half the angle of rotation of the articulated shoe in order to maintain the required line-of-sight. The measured roll movements of the articulated shoe are transmitted to a Dove prism in the optical system, which causes the image to be rotated to correspond with the roll of the articulated shoe. The mirror, which represents the operator's eye position, is maintained at a predetermined height above the surface of the terrain model by a height servo loop.

The present invention, however, differs from the above-identified British Patent in the provision which this invention has for protection of the terrain-following head unit from damage resulting from collision with features on the terrain model.

The terrain-following head unit must be sufficiently small to move over the terrain model in a realistic way and must necessarily pass close to features on the terrain model, such as buildings, trees, rocks, and the like. Because of the inexperience of the operators being trained, they may crash the terrain-following head unit into features on the terrain model.

In the prior equipment, the articulated shoe and the mirror of the optical system were each mounted separately in such a way as to be displaceable against springs in the event of contact with features on the terrain model, and such displacement resulted in the operation of a micro-switch to signal a dangerous condition and to stop the training exercise. This required a complex mounting structure which undesirably increased the overall dimensions of the terrain-following head unit and, thus, reduced both accuracy and realism. Also, it was responsive only to forces applied to the terrain-following head unit in particular directions.

Another image pick-up assembly with which the present invention is useful is that disclosed in U.S. Pat. No. 4,365,960 to Reed et al. and assigned to the same Assignee as the present invention.

OBJECT AND INVENTION SUMMARY

In accordance with the present invention, the image pick-up assembly for a vehicle training simulator has a television camera and a terrain-following head unit to traverse a terrain model. The terrain-following head unit includes an optical system to transmit an image of the terrain to the television camera, wherein the terrain-following head unit is coupled to the television camera by a unique gimbal joint permitting universal movement.

Locking means can set the terrain-following head unit in a normal operating position relative to the television camera that is fixed but is releasable by a predetermined force if the terrain-following head unit engages an obstacle. The optical system of the terrain-following head unit includes both a reflector and an objective lens and is coupled to the television camera by a flexible bellows to accommodate relative movement between the terrain-following head unit and the television camera.

Preferably, the gimbal joint has two parts with matching part-spherical annular surfaces. The locking means has several spring-loaded balls mounted on one part of the gimbal joint and has engaging recesses in the part-spherical annular surface of the other part.

In a preferred arrangement of the invention, a proximity sensor is positioned to provide additional protection for the terrain-following head unit by generating signals to indicate the close approach of the terrain-following head unit to features on the terrain model. In one arrangement of the invention, this proximity sensor takes the form of a general structure surrounding the terrain-following head unit and is resiliently displaceable relative to the terrain-following head unit, displacement of the guard structure in any direction resulting in actuation of an electrical contact.

In the preferred construction, the guard structure is carried by resilient rods, each of which is electrically conductive and extends with clearance through an electrical contact ring which it contacts to close a circuit when the guard structure is displaced. Such a structure is that described in the above-identified U.S. Pat. No. 4,368,960.

BRIEF DESCRIPTION OF THE DRAWINGS

The invention will now be described in more detail with the aid of an example illustrated in the accompanying drawings, in which:

FIG. 3A is a detailed view taken along the line A—A of FIG. 3, and

DETAILED DESCRIPTION

Figure 1:
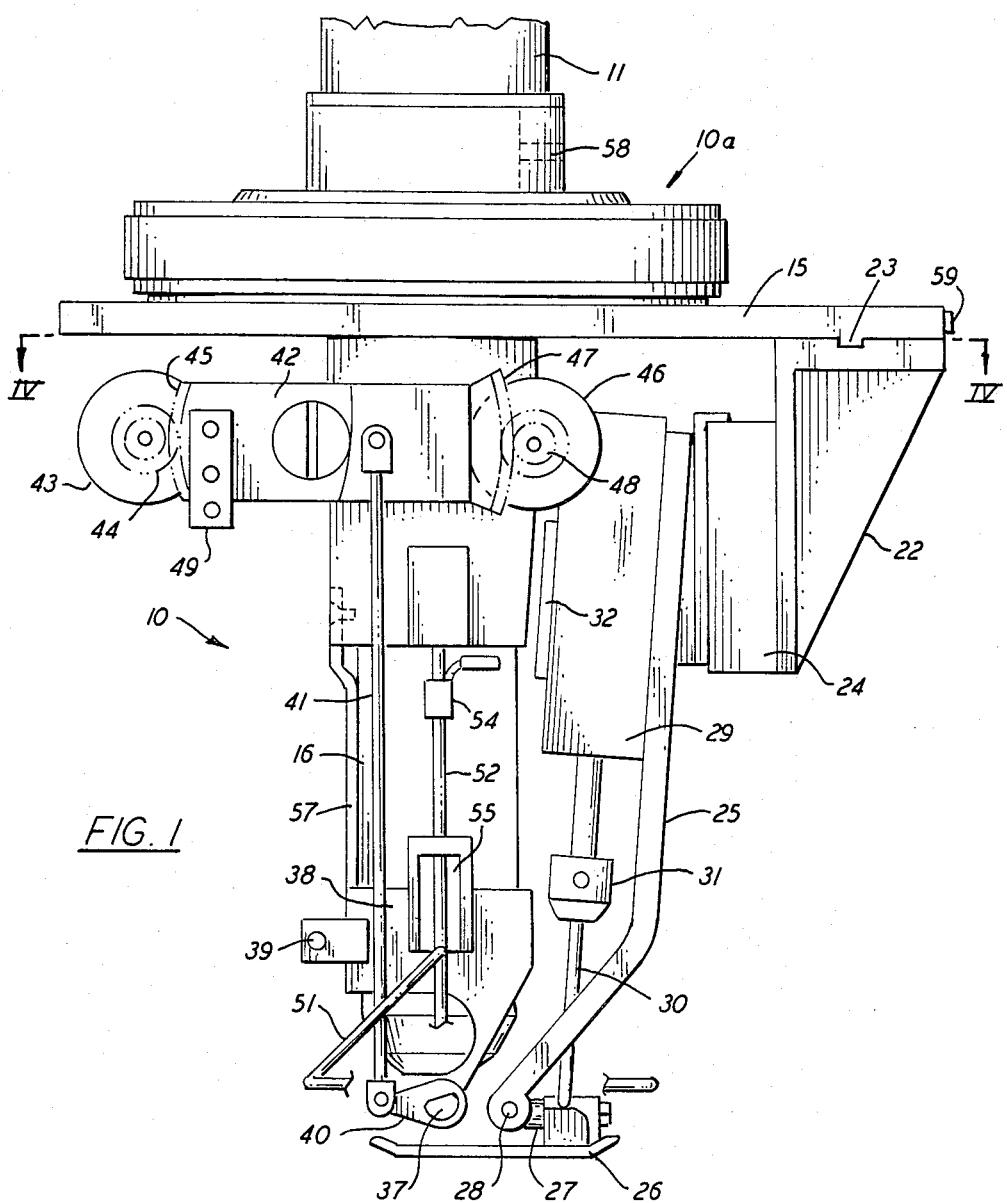
FIG. 1 is a side view of a terrain-following head unit mounted on a television camera support to form an image pick-up assembly, in accordance with the invention, with parts of the guard structure cut away for clarity.

The terrain-following head unit 10 is attached by way of a gimbal joint 10a to a television camera tube 11. The gimbal joint 10a has a fixed part 12 which is secured to the television camera tube 11 by two clamps, each of which consists of a pair of blocks, a front block 13 and a rear block 14, coupled by a clamping screw 18 (see FIG. 3A).

The terrain-following head unit 10 has a mounting plate 15 which carries an objective lens 16 connected to the camera tube 11 by way of a sealing bellows 17 which allows for swinging movement of the terrain-following head unit 10 relative to the camera tube 11 about the gimbal joint 10a. The gimbal joint 10a and the sealing bellows 17 are best seen in FIG. 2 of the drawings.

Figure 2:
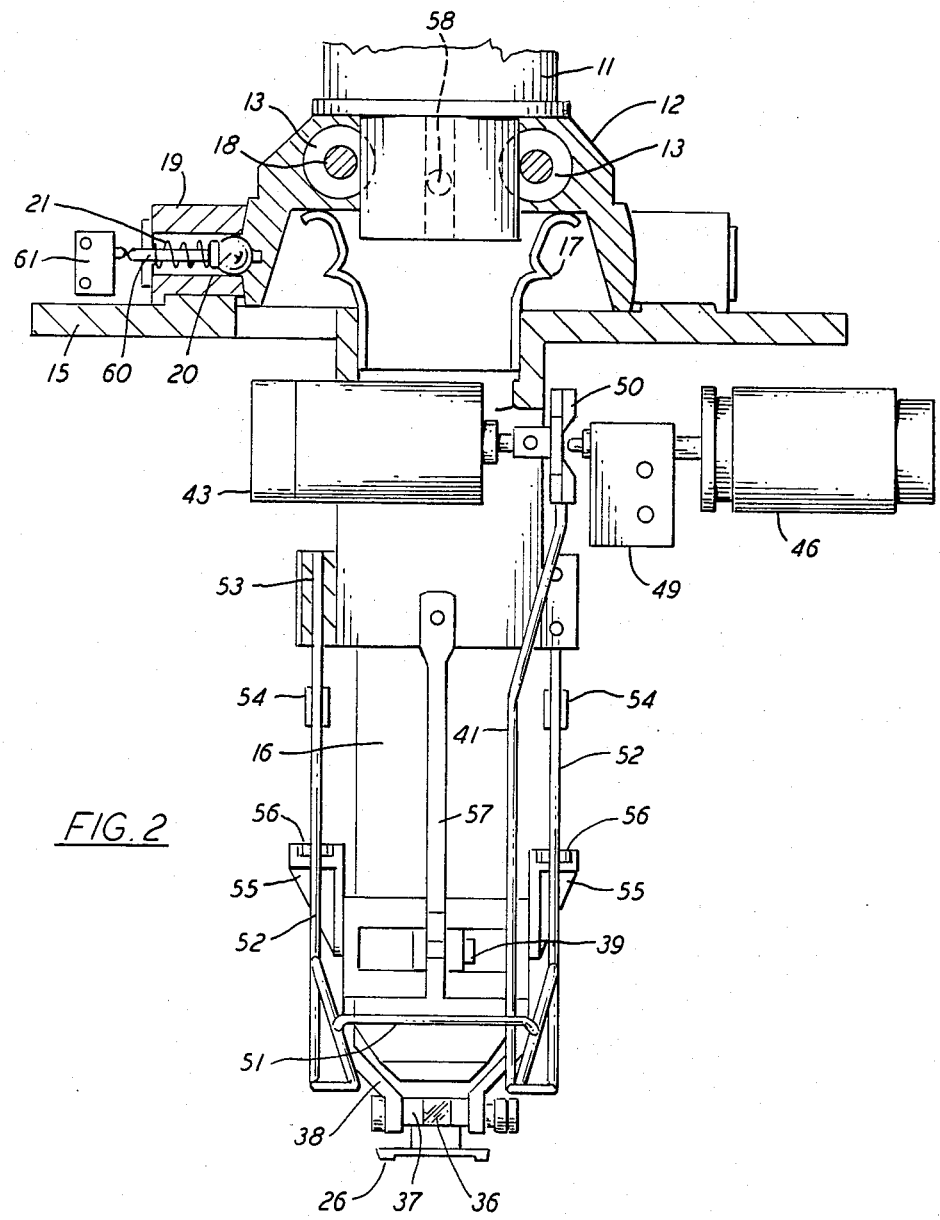
FIG. 2 is a front view of the assembly shown in FIG. 1 with certain parts shown in cross-section.

Also seen in FIG. 2 of the drawings is the fixed part 12 and a movable part 19 attached to the mounting plate 15. The parts 12 and 19 are in engagement over matching part-spherical annular surfaces and are locked in the normal operation position with the objective lens 16 in vertical alignment with the television camera tube 11 by means of several balls 20 (at least six balls), each spring-loaded by a spring 21. The spring-loaded balls 20 are mounted in bores in the movable parts 19 and engage recesses in the part-spherical surface of the fixed part 12.

Figure 3:
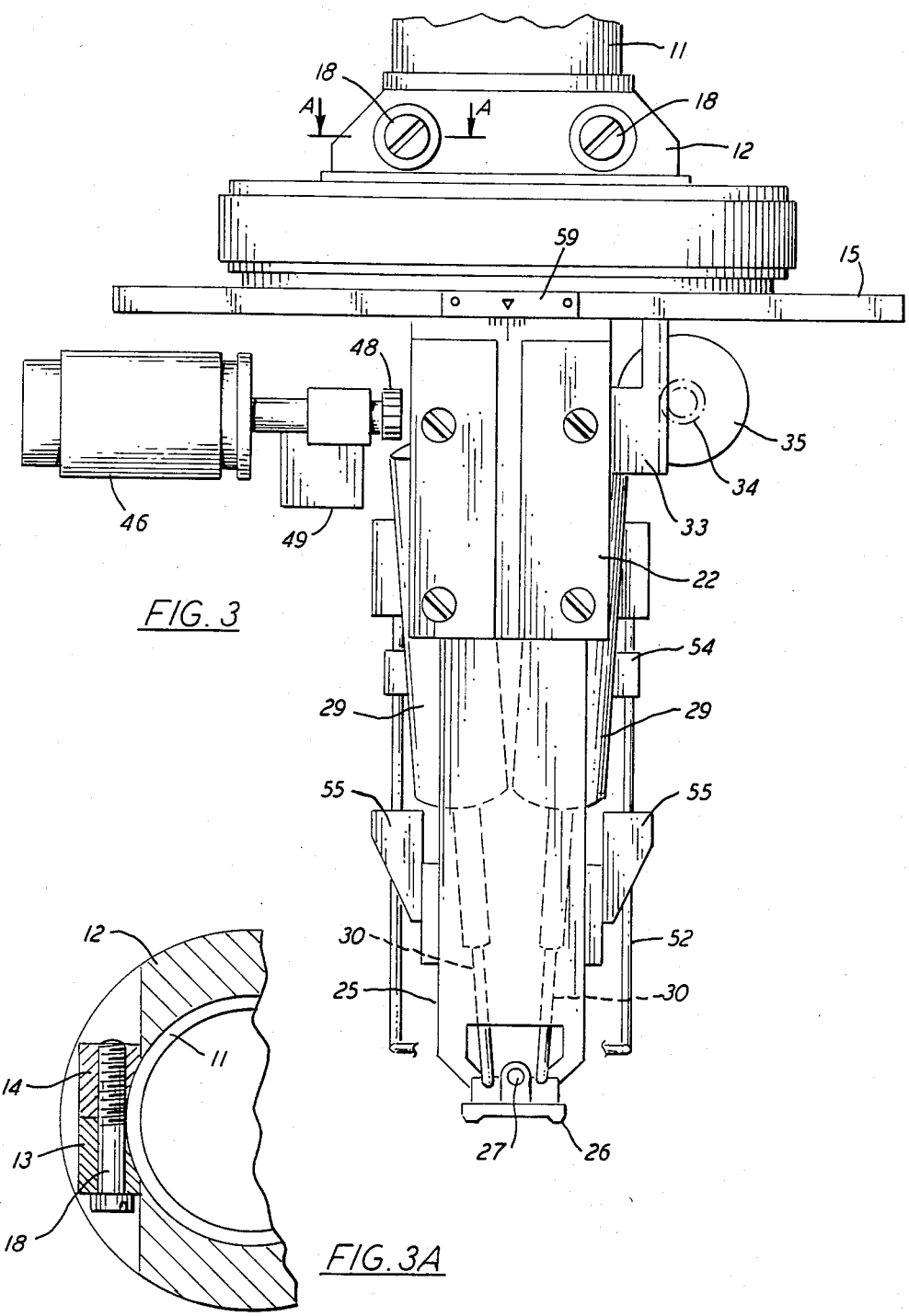
FIG. 3 is a rear view of the assembly of FIGS. 1 and 2.

Referring to FIGS. 1 and 3 of the drawings, a bracket 22 is attached to the underside of the mounting plate 15 by means of a dove-tail sliding joint 23 which allows the bracket 22 to be displaced sideways or laterally. The bracket 22 carries a linear bearing 24 on which an arm 25 is mounted for sliding movement in an approximately vertical direction. An articulated shoe 26 is mounted pivotally on a shaft 27 which in turn is connected pivotally to the arm 25 about an axis 28. The movements of the articulated shoe in pitch and roll as it travels over the terrain model are detected by two linear voltage differential transducers 29 whose cores 30 rest on the articulated shoe under the influence of weights 31.

Figure 4:
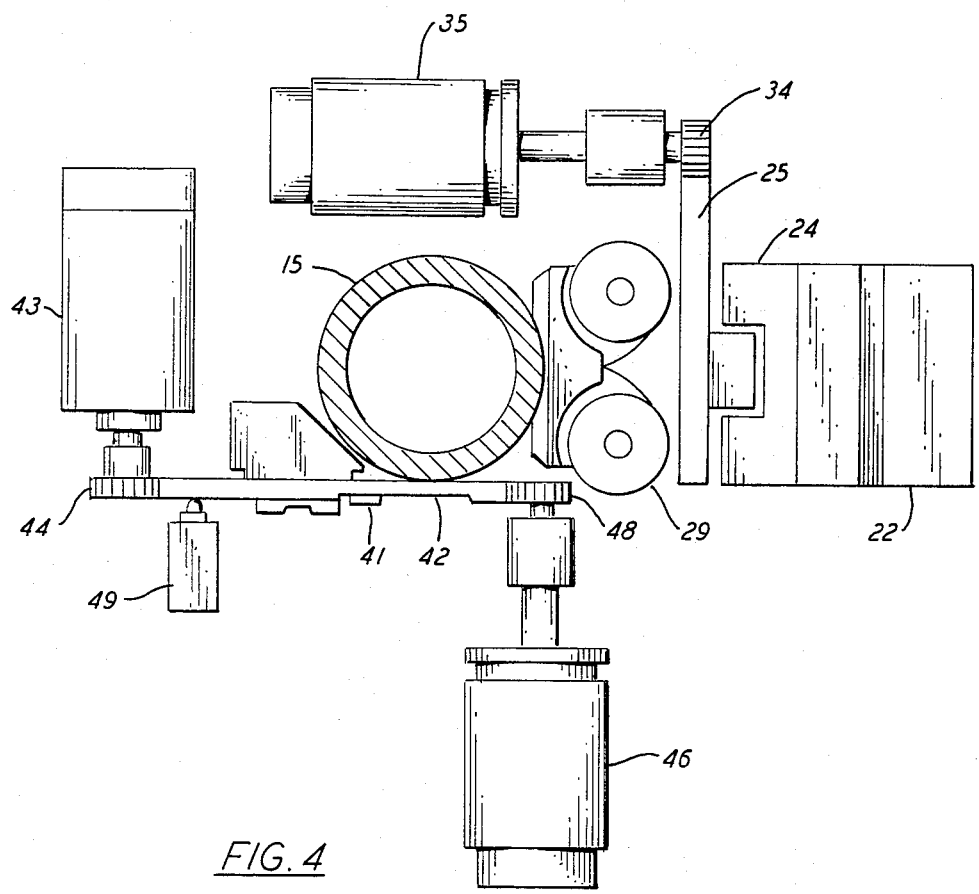
FIG. 4 is a schematic plan view of the terrain-following head unit on the line IV of FIG. 1.

The transducers 29 are clamped to the arm 25 by a clamp 32. Vertical movement of the articulated shoe causes the arm 25 to slide up and down, and this movement is transmitted by a rack 33 and pinion 34 to a vertical position transducer 35 (see FIGS. 3 and 4).

A mirror 36, in FIG. 2, is fixed to a shaft 37 which is mounted rotatably in a frame 38 clamped by a screw 39 to the lower end of the objective lens 16. The mirror 36 is rotatable by means of a crank arm 40 fixed to the shaft 37 and coupled by a connecting rod 41 to a lever 42.

A motor 43 is connected to move a spar gear 44 which meshes with a segment gear 45 on one end of the lever 42. The motor 43 is controlled by a signal derived from the sum of the outputs of transducers 29, representing the pitch movement of the articulated shoe 26.

The other end of the lever 42 drives a mirror position transducer 46 through a segment gear 47 and a spar gear 48. The range of movement of the lever 42 is limited by a switch 49 actuated by a cam 50 mounted on the lever 42.

The terrain-following head unit 10 is provided with a proximity sensor which includes a guard structure 51 in the form of a wire cage surrounding the region of the mirror 36 and the articulated shoe 26 at the lower end of the terrain-following head unit 10. The guard structure 51 is carried in resilient rods 52 which are fixed to the mounting plate 15 by way of electrically-insulating bushings 53. An electrical connection is made to each of the rods 52 at a point 54.

Two brackets 55 on the frame 38 carry electrical contact rings 56, FIG. 2, through which the rods 52 pass with clearance when in the undisturbed condition. When the guard structure 51 encounters an obstacle, the resilient rods 52 are deflected and come into electrical contact with the rings 56, thus establishing an electrical circuit which can actuate an alarm or danger signal and also may initiate raising of the terrain-following head unit 10 from the terrain model to prevent damage.

An alignment post 57 is provided to position the frame 38 in the correct angular position when mounting the mirror 36. A heading alignment peg 58, in FIGS. 1 and 2, locates the terrain-following head unit 10 in the correct angular position relative to the television camera tube 11.

A graduated scale 59, FIGS. 1 and 3, shows the displacement of the bracket 22 with the attached articulated shoe 26 and the transducers 29 to one side or the other of the center line to vary the driving position across the width of the simulator vehicle.

The gimbal joint 10a, between the fixed part 12 and the movable part 19, protects the terrain-following head unit 10 from damage when the proximity sensor is inadequate to do so. The spring-loaded balls 20, FIG. 2, lift against the springs 21 to allow swinging movement of the terrain-following head unit 10 in any direction when it collides with an obstacle.

The spring-loaded balls 20 also provide a restoring force to re-set the terrain-following head unit 10 in the preset vertical position when it has been lifted free of an obstacle.

Each of the springs 21 acts on its respective ball 20 through a pin 60 which engages a switch 61. Thus, whenever a spring-loaded ball 20 is lifted, one or more switches 61 are actuated to sense the displacement of the gimbal joint 10a. The resulting electrical signal can be used to lift the terrain-following head unit 10 from the terrain model.

In view of the above detailed description of the presently preferred form of the invention, various modifications, variations, advantages, and uses will occur to one skilled in this art. Accordingly, the description presently presented hereinabove is to be considered as illustrative only, the true spirit and scope of the invention being that defined by the claims appended hereto.

I claim:

1. An image pick-up assembly for a vehicle training simulator comprising a television camera and a terrain-following head unit to traverse a terrain model; the terrain-following head unit including an optical system to transmit an image of the terrain to the television camera; said terrain-following head unit is coupled to the television camera by a gimbal joint to couple said terrain-following head unit to said television camera to permit universal movement; and means to lock the terrain-following head unit in a normal operating position relative to the television camera, said means being releasable by a predetermined force if the terrain-following head unit engages an obstacle.

2. An assembly as claimed in claim 1 in which the optical system of the terrain-following head unit includes a reflector and an objective lens and is coupled to the television camera by a flexible bellows to accommodate relative movement of the terrain following head unit and the television camera.

3. An assembly as claimed in claim 2 in which the gimbal joint comprises two parts with mating part-spherical annular surfaces.

4. An assembly as claimed in claim 3 in which the locking means comprises a plurality of spring-loaded balls mounted on one part of the joint and engaging recesses in the part-spherical annular surface of the other part.

5. An assembly as claimed in claim 4 including an electrical switch connected with each of a number of said balls to sense when the ball is lifted out of its recess by movement of the terrain-following head unit about the gimbal joint.

6. An assembly as claimed in claim 5 including a proximity sensor in the form of a guard structure surrounding the terrain-following head unit and resiliently displaceable relative to the terrain-following head unit, displacement of the guard structure in any direction resulting in actuation of an electrical contact.

7. An assembly as claimed in claim 6 in which the guard structure is carried by resilient rods each of which is electrically conductive and extends with clearance through an electrical contact ring which it contacts to close an electrical circuit when the guard structure is displaced.

8. An image pick-up assembly for a vehicle training simulator, comprising:
an optical system to detect images substantially continuously in a direction of travel movement and to transmit said images substantially perpendicular to said direction of travel to an electronic camera means,
a terrain-following head unit to traverse a terrain model and adapted to contain said optical system during said travel movement,
a gimbal joint means to couple said terrain-following head unit to said electronic camera means to permit relative universal movement between said terrain-following head unit and said camera means, and
releasable locking means to lock said terrain-following head unit in a normal operating position relative to said electronic camera means, said locking means being releasable by a predetermined force if the terrain-following head unit engages an obstacle.

9. An image pick-up assembly as claimed in claim 8 in which said gimbal joint means includes two matching surfaces in sliding engagement and said two surfaces being formed with a predetermined radius of curvature.

10. An image pick-up assembly as claimed in claim 9 in which said releasable locking means includes a plurality of spring-loaded balls mounted in bores formed in one part that defines one of said matching surfaces, and a second part having means to define a plurality of recesses each to receive one of said spring-loaded balls.

11. An image pick-up assembly as claimed in claim 10 in which each of said springs that provide a predetermined magnitude force includes a pin positioned to move in response to movement of said balls to actuate an electrical switch.

12. An image pick-up assembly is claimed in claim 11 including an articulated shoe means, a plurality of position transducer means, and means to connect an intermediate rack and pinion between said articulated shoe means and each of said position transducer means, so that any movement of said articulated shoe means is represented by an electrical signal generated by at least one position transducer means.

* * * * *